(12) United States Patent
Judd et al.

(10) Patent No.: US 11,994,169 B2
(45) Date of Patent: May 28, 2024

(54) GUIDE ROLLER HAVING MAGNETS AND BUSHINGS TO STABILIZE A ROLLER BARREL FOR A TAPE MEDIUM

(71) Applicant: INTERNATIONAL BUSINESS MACHINES CORPORATION, Armonk, NY (US)

(72) Inventors: Kevin Bruce Judd, Tucson, AZ (US); Walter Haeberle, Waedenswil (CH); Simeon Furrer, Altdorf (CH); Mark Alfred Lantz, Adliswil (CH); Armando Argumedo, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/821,248

(22) Filed: Aug. 22, 2022

(65) Prior Publication Data
US 2024/0060537 A1 Feb. 22, 2024

(51) Int. Cl.
G11B 15/60 (2006.01)
F16C 13/02 (2006.01)
F16C 32/04 (2006.01)
F16C 39/06 (2006.01)

(52) U.S. Cl.
CPC .......... F16C 39/066 (2013.01); F16C 13/02 (2013.01); F16C 32/0427 (2013.01); *F16C 2202/40* (2013.01); *F16C 2380/00* (2013.01)

(58) Field of Classification Search
None
See application file for complete search history.

(56) References Cited

U.S. PATENT DOCUMENTS

| | | | |
|---|---|---|---|
| 5,447,278 A | 9/1995 | Lalouette et al. | |
| 5,598,048 A | 1/1997 | Dunfield et al. | |
| 6,141,184 A * | 10/2000 | Daly | G11B 15/67 |
| 6,448,679 B1 | 9/2002 | Imlach | |
| 6,744,593 B1 | 6/2004 | Nayak et al. | |
| 7,276,828 B2 | 10/2007 | Yeh et al. | |
| 7,501,922 B2 | 3/2009 | Kazadi | |

(Continued)

FOREIGN PATENT DOCUMENTS

| | | | | |
|---|---|---|---|---|
| EP | 1605452 A2 | 12/2005 | | |
| JP | 01094560 A * | 4/1989 | ......... | G03C 7/73006 |

(Continued)

OTHER PUBLICATIONS

English-machine translation of JP 63-222361 A, published on Sep. 16, 1988. (Year: 1988).*

(Continued)

*Primary Examiner* — William J Klimowicz
(74) *Attorney, Agent, or Firm* — KONRAD, RAYNES, DAVDA & VICTOR LLP; David W. Victor (57) ABSTRACT

Provided are a tape guide roller and tape drive having a guide roller having magnets and bushings to stabilize a roller barrel for a tape medium. The tape guide roller has a roller barrel extending around a vertical axis. The tape medium passes across the roller barrel to guide the tape medium on a tape path. A plurality of magnets positioned with respect to the vertical axis provide an axial force to stabilize the tape guide roller axially.

13 Claims, 9 Drawing Sheets

(56) References Cited

U.S. PATENT DOCUMENTS

| | | | |
|---|---|---|---|
| 8,749,922 B2 | 6/2014 | Argumedo et al. | |
| 2009/0201608 A1* | 8/2009 | Argumedo | G11B 15/60 360/130.21 |
| 2009/0201609 A1* | 8/2009 | Argumedo | G11B 15/60 360/130.21 |
| 2012/0050909 A1* | 3/2012 | Lantz | G11B 15/602 |
| 2013/0021692 A1* | 1/2013 | Argumedo | G11B 15/60 360/71 |
| 2013/0021693 A1* | 1/2013 | Argumedo | G11B 15/60 360/73.04 |
| 2014/0362465 A1 | 12/2014 | Anderson et al. | |

FOREIGN PATENT DOCUMENTS

| | | | | |
|---|---|---|---|---|
| JP | S63222361 A | * | 9/1989 | G11B 15/60 |
| KR | 100203427 B1 | * | 6/1999 | G11B 15/6653 |
| WO | 2015125958 A1 | | 8/2015 | |
| WO | 2021027608 A1 | | 2/2021 | |

OTHER PUBLICATIONS

PCT International Search Report and Written Opinion dated Oct. 9, 2023, 13 pp. for Application No. PCTIB2023/056959.

* cited by examiner

GUIDE ROLLER HAVING MAGNETS AND BUSHINGS TO STABILIZE A ROLLER BARREL FOR A TAPE MEDIUM

BACKGROUND OF THE INVENTION

1. Field of the Invention

Provided are a tape guide roller and tape drive having a guide roller having magnets and bushings to stabilize a roller barrel for a tape medium.

2. Description of the Related Art

In magnetic storage systems, data is read from and written onto magnetic recording media utilizing magnetic read and write elements formed on a tape head. Data is written on the magnetic recording media by moving a magnetic recording transducer to a position over the media where the data is to be stored. The magnetic recording transducer generates a magnetic field, which encodes the data into the magnetic media. Data is read from the media by similarly positioning the magnetic read element and then sensing the magnetic field of the magnetic media. Read and write operations may be independently synchronized with the movement of the media to ensure that the data can be read from and written to the desired location on the media.

Tape drives include tape guide rollers positioned with respect to the read/write tape head to guide and position the tape medium to pass over the read/write tape head. Tape guide rollers include ball bearings in a roller barrel over which the tape medium passes. Tape guide rollers are one of the primary contributors to mechanical disturbances in the tape drive that increase the standard deviation of a position error signal (PES), which results in more read and write errors by the tape head. One technique to reduce mechanical disturbances introduced by the tape guide roller is to use air bearing rollers, which require pressurized air to function.

Tape guide rollers with low mechanical disturbances are further needed in tape paths used for servo formatting, i.e. for writing a servo pattern onto tape at tape manufacturing time. Mechanical disturbances caused by tape guide rollers during servo formatting lead to disturbances being written-in to the servo patterns of a tape medium/cartridge, which further degrades the standard deviation of a position error signal (PES) during read and write operations in a tape drive.

There is a need in the art for improved techniques to implement a tape guide roller to reduce mechanical disturbances in the tape drive.

SUMMARY

Provided are a tape guide roller and tape drive having a guide roller having magnets and bushings to stabilize a roller barrel for a tape medium. The tape guide roller has a roller barrel extending around a vertical axis. The tape medium passes across the roller barrel to guide the tape medium on a tape path. A plurality of magnets positioned with respect to the vertical axis provide an axial force to stabilize the tape guide roller axially.

DETAILED DESCRIPTION

Tape cartridge capacity gains require improved track density scaling to read ever increasing denser tracks. A key enabler for track density scaling is improving the track following performance of the tape drive, i.e. reducing the standard deviation of a position error signal (sigma PES) in reading and writing data during track following. Track following performance may be limited by mechanical disturbances in the tape drive. One of the main contributors to these disturbances are the tape guide rollers which typically use ball bearings and generate disturbances across a broad range of frequencies. These disturbances shift to higher frequencies with increasing tape speed making it more challenging to achieve a low sigma PES at high tape speed. The disturbances caused by the tape roller guides also vary significantly from roller to roller most likely due to variations in the bearings themselves and the assembly process.

Described embodiments provide improved techniques for the components of a tape guide roller that deploy passive magnetic bearings in the tape guide roller to provide axial stability of the roller combined with bushings for the axle, extending through the roller barrel, to provide radial stability. Further embodiments may utilize a thrust bearing positioned at the bottom of the axle extending through the roller barrel. Utilizing some combination of components of the magnet, bushings, and thrust bearing has been found to improve track following performance and a lower sigma PES than what has been achieved with ball bearing rollers. Further, using the magnets, bushings, and/or thrust bearing has been found to have track following performance comparable to tape guide rollers using air bearing rollers, which are substantially more expensive to manufacture, than the described embodiments of magnetic bearings, bushings, and/or a thrust bearing.

In one embodiment, the tape guide roller is implemented with passive magnetic bearings (PMB) combined with a thrust bearing. In a further embodiment, the tape guide roller is implemented with passive magnetic bearings combined with bushings, which may comprise synthetic sapphire/ruby/corundum, and a thrust bearing. The described embodiments provide track following performance that is an improvement over current ball bearing rollers and has a comparable performance profile to that realized with air bearing tape guides. However, the described embodiments can be manufactured at a much lower cost than air bearing rollers.

Figure 1:
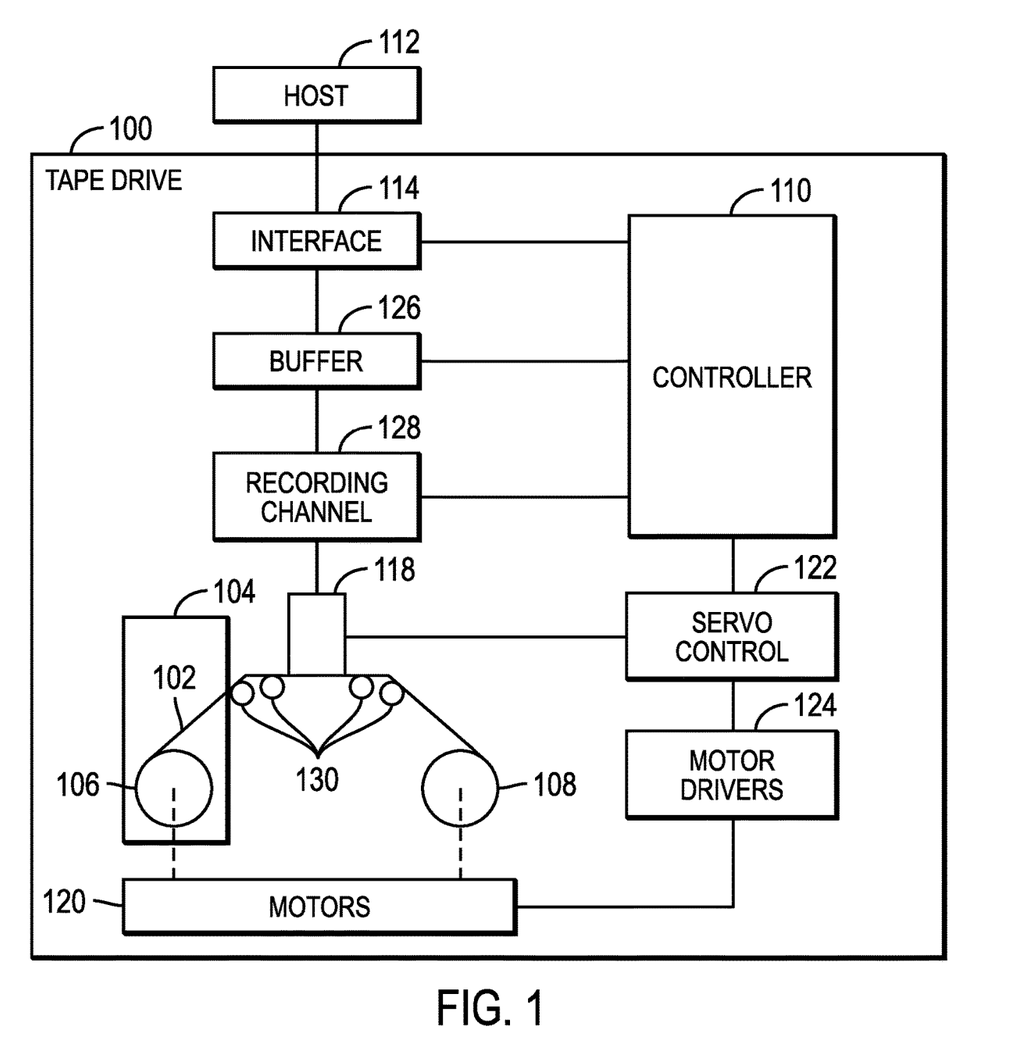
FIG. 1 illustrates an embodiment of a tape drive system in which embodiments are implemented.

FIG. 1 illustrates an embodiment of a tape drive 100 to read and write with respect to a magnetic tape 102 of a magnetic tape cartridge 104. The magnetic tape cartridge 104 comprises a length of magnetic tape 102 wound on one or two reels 106, 108. By way of example, the magnetic tape cartridge 102 may comprise a single reel tape, such as adhering to the Linear Tape Open (LTO) format. An example of a tape drive 100 is the International Business Machines Corporation TS1160 Tape Drive. Other implementations of the tape cartridge 102 and tape drive may also be used, such as LTO type tape drives.

The tape drive 100 may further include one or more controllers 110 to operate the tape drive 100 in accordance with commands received from a host system 112 received at an interface 114. The controller 110 includes logic and/or one or more microprocessors with a memory for storing information and program information for operating the microprocessor(s). The tape drive 100 may comprise a standalone unit or comprise a part of a tape library or other subsystem. The tape drive 100 may be coupled to the host system 112 directly, through a library, or over a network, and employ at interface 14 a Small Computer Systems Interface (SCSI), an optical fiber channel interface, etc.

The tape cartridge 104 may be inserted in the tape drive 100, and loaded by the tape drive 100 mechanisms so that one or more read and/or write elements on a tape head 118 reads and/or writes information in the form of signals with respect to the magnetic tape 104 as the tape is moved longitudinally by one or more motors 120 which rotate the reels 106, 108. Tape guide rollers 130 guide the tape 104 across the tape head 118 to stabilize the positioning of the tape 104 with respect to the head 118 to reduce position error signals (PES). The magnetic tape typically comprises a plurality of parallel tracks, or groups of tracks. In some formats, such as the LTO format, above, the tracks are arranged in a serpentine back and forth pattern of separate wraps, as is known to those of skill in the art.

The recording system may comprise a servo control system 122 to electronically switch to another set of read and/or write elements on the tape head 118, and/or to seek and move the tape head 118 laterally on the tape 102, to position the read and write elements at a desired wrap or wraps, and to track follow the desired wrap or wraps. The servo control system 122 may also control the operation of the motors 120 through motor drivers 124 and in response to instructions from the controller 110.

The controller 110 also provides the data flow and formatter for data to be read from and written to the tape, employing a buffer 126 and a recording channel 128. The controller 110 may comprise program code in a memory device that is loaded into a processor and executed to perform the tape drive operations. Alternatively, some or all of the functions of the controller 110 may be implemented as microcode or firmware in hardware devices in the tape drive 100, such as in Application Specific Integrated Circuits (ASICs). The buffer 126 may comprise a suitable volatile or non-volatile memory device known in the art.

Figure 2:
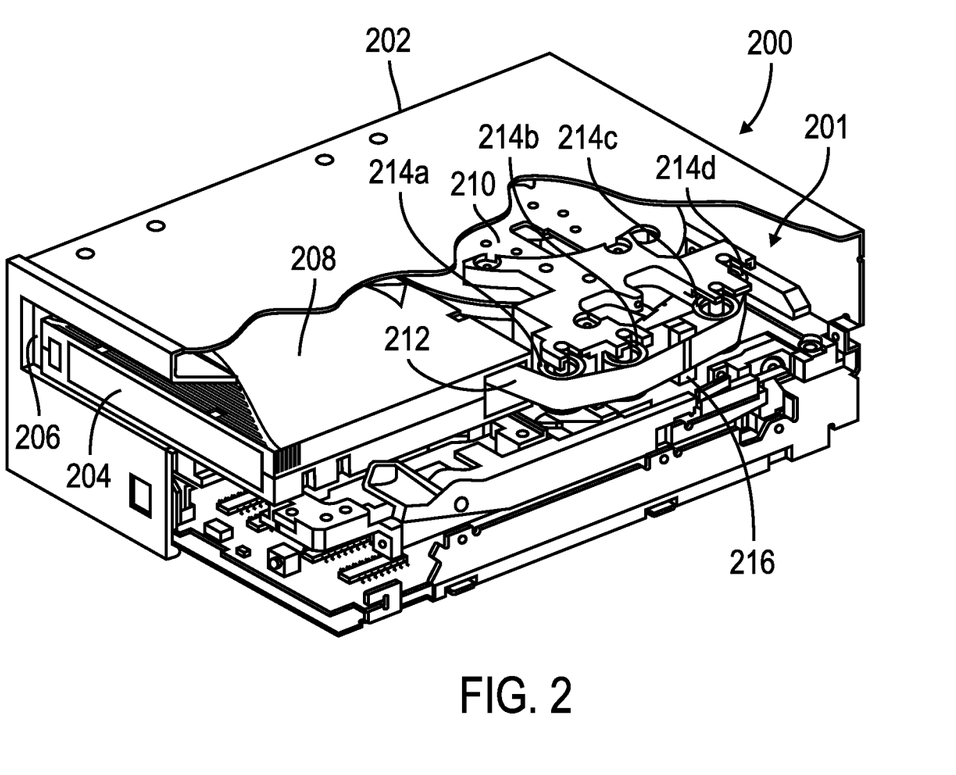
FIG. 2 illustrates an embodiment of a cut-away of the tape drive housing to show internal components of the tape drive.

FIG. 2 illustrates an embodiment of a tape drive 200 showing internal components within a cut away 201 of the tape drive housing 202. The tape drive 200 includes a housing 202, a tape cartridge 204 inserted into an opening 206 of the tape drive 200. The cartridge includes a supply reel 208 having the tape medium that is accessed by the take-up reel 210 that feeds the tape medium 212 over tape guide rollers 214a, 214b, 214c, 214d to guide the tape 212 over a tape head 216 to read and write with respect to the tape medium 212.

Figure 3:
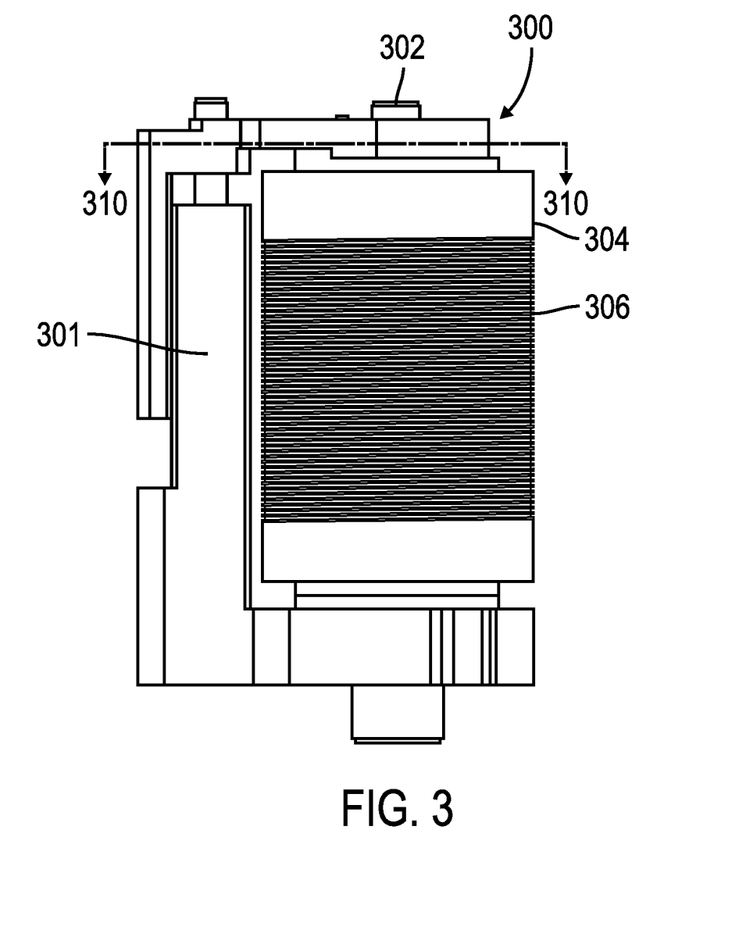
FIG. 3 illustrates an embodiment of a side view of a tape guide roller.

FIG. 3 illustrates an embodiment of a tape guide roller 300, such as one of the guide rollers 214a, 214b, 214c, 214d in FIGS. 2 and 130 in FIG. 1. The tape guide roller 300 has a housing 301 includes an axle 302, or shaft, that extends along a vertical axis extending through the center of the roller barrel 304. The housing 301 is formed so as to expose a full surface of the roller barrel 304 over which the tape medium passes. The roller barrel 304 forms a grooved surface 306 over which the tape medium 212 passes. The grooved surface 306 improves traction between the tape medium 212 and the roller barrel 304. The grooves 306 may comprise ridges forming a spiral across the roller barrel 304 or be in parallel.

Figure 4:
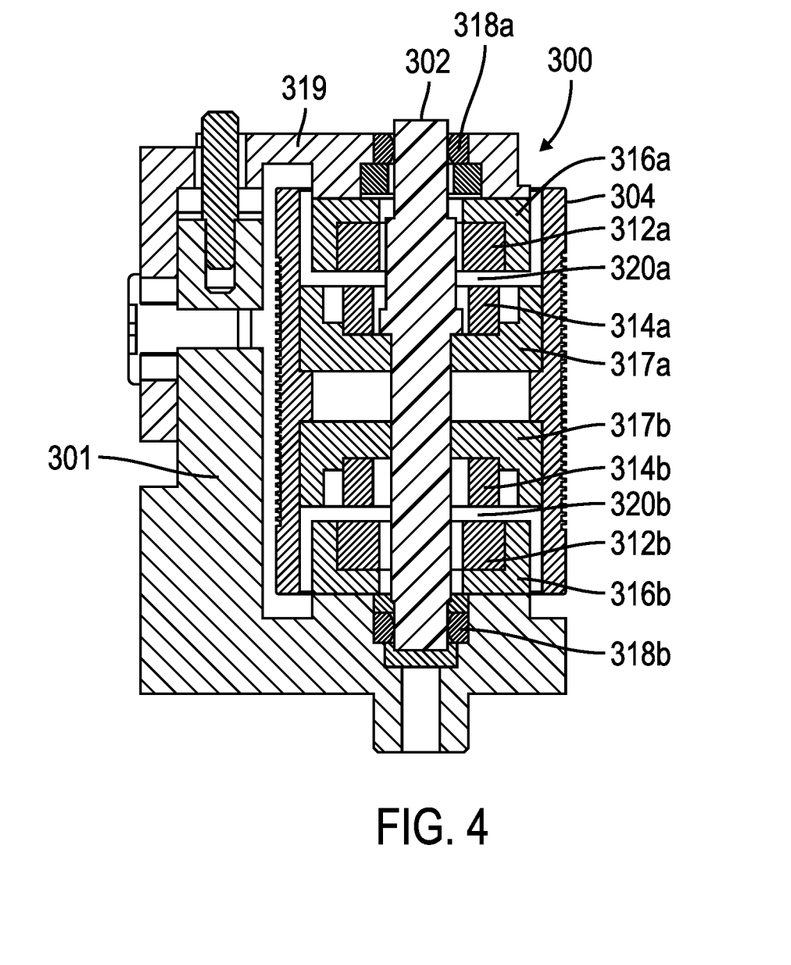
FIG. 4 illustrates an embodiment of a cross-sectional view of the tape guide roller of FIG. 3.

FIG. 4 illustrates a cross sectional view of the tape guide roller 300 of FIG. 3 taken along a vertical cross section 310 in FIG. 3. Inside the roller barrel 304 there are two opposing pairs of magnets, upper ring magnets 312a, 314a and two opposing lower ring magnets 312b, 314b. There is an open space 320a, 320b between each pair of magnets 312a, 314a and 312b, 314b, respectively. Each pair of opposing magnets 312a, 314a and 312b, 314b may have opposite polarization. In alternative embodiments, each pair of magnets 312a, 314a and 312b, 314b may form concentric rings. The ring magnets 312a, 314a and 312b, 314b may comprise axial radial passive magnet bearings. The magnets 312a, 312b, 314a, 314b provide axial stabilization of the axle 302 and the roller barrel 304 to reduce position error signal (PES).

Each pair of opposing magnets comprise an outer magnet 312a, 312b and an inner magnet 314a, 314b. Outer magnets 312a, 312b are mounted to outer support structures 316a, 316b, respectively. Inner magnets 314a, 314b are mounted to inner support structures 317a, 317b, respectively. The inner support structures 317a, 317b are attached to the axle 302 and the barrel 304 and couple the axle 302 to the barrel 304. The barrel 304 rotates when the axle 302, to which the barrel 304 is fixed, rotates. The axle rotating rotates the inner magnets 314a, 314b.

The outer magnets 312a, 312b are fixed to the outer support structures 316a, 316b and may not rotate relative to the axle 302 and barrel 304. The inner magnets 314a, 314b rotate relative to the outer magnets 312a, 312b, respectively, when the axle 302 rotates. The outer magnets 312a, 312b may not rotate as they are fixed to the outer support structures 316a, 316b, respectively, which are not connected to the axle 302.

The upper end of the axle 302 extends through an upper bushing 318a and is supported by an upper bushing support 319. The bottom bushing 318b may be fixed to the structure. Both the bushings 318a, 318b may be non-rotating and comprise synthetic sapphire, synthetic ruby, corundum or other material having high hardness, low friction and wear, and a very smooth surface resulting from polishing. A lubricant may be applied between the axle 302 and the bushings 318a, 318b.

Figure 5:
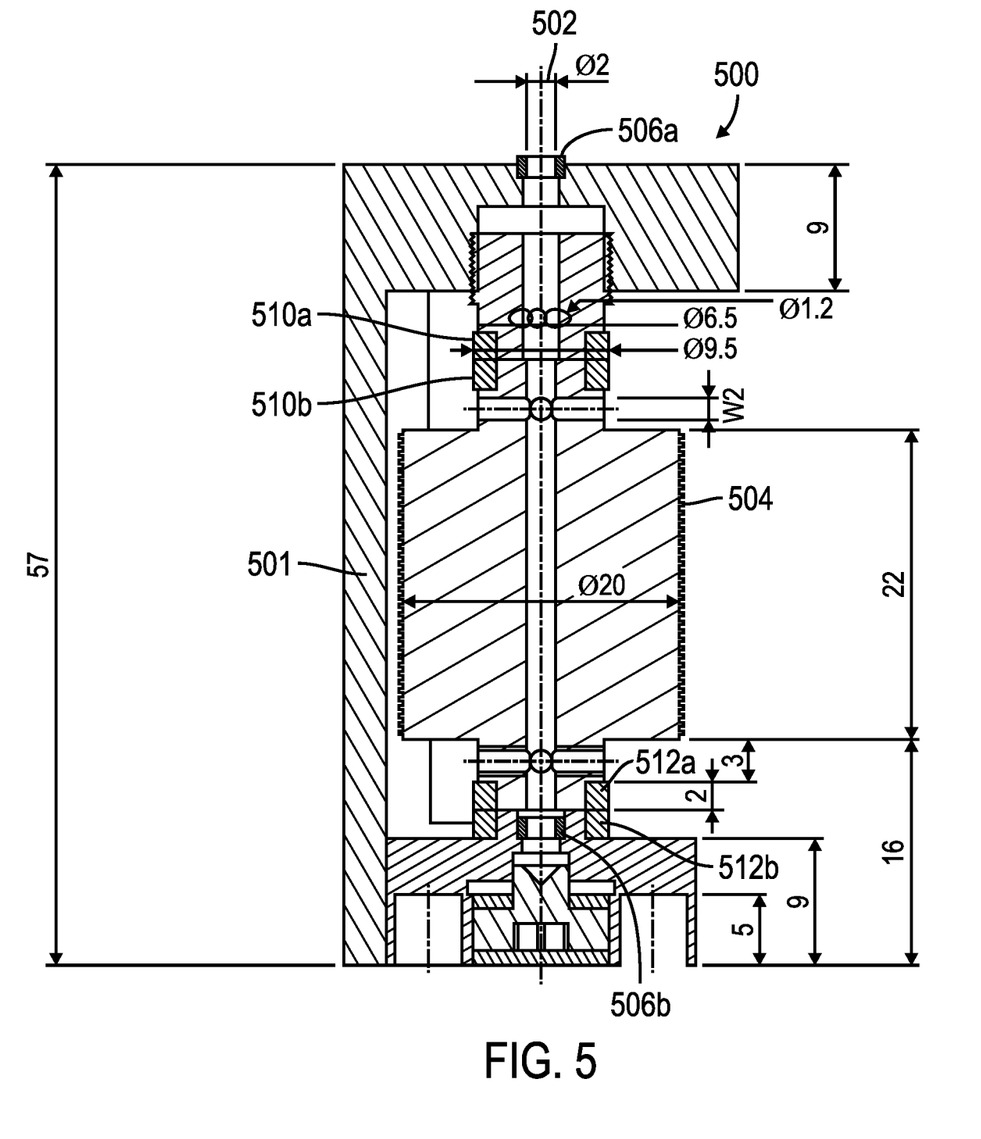
FIG. 5 illustrates a cross-sectional view of an embodiment of a tape guide roller.

FIG. 5 provides a sectional view of a further embodiment of a guide roller 500 having a housing 501, an inner space 502 for an axle (not shown), a roller barrel 504, an upper bushing 506a and a lower bushing 506b through which the axle extends through inner space 502. There are also opposing pairs of upper 510a, 510b and opposing pairs of lower 512a, 512b ring passive magnet bearings. In FIG. 5 the upper magnets 510a, 510b are positioned above the upper end of the roller barrel 504 with respect to the vertical axis and the lower magnets 512a, 512b are positioned below the lower end of the roller barrel 504. Each pair of opposing magnets comprise an outer magnet 510a, 512b and an inner magnet 510b, 512a. The outer magnets 510a, 512b are fixed to the roller housing/outer support structures (located above and below the outer magnets 510a, 512b, respectively) and may not rotate relative to an axle disposed in inner space 502 and barrel 504. The inner magnets 510b, 512a are attached to the axle (not shown) in the inner space 502 and the barrel 504 and. The inner magnets 510b, 512a rotate relative to the outer magnets 510a, 512b, respectively, when the axle in the inner space 502 and barrel 504 rotates. Noted distances in the diagram between components are in millimeters (mm).

Figure 6:
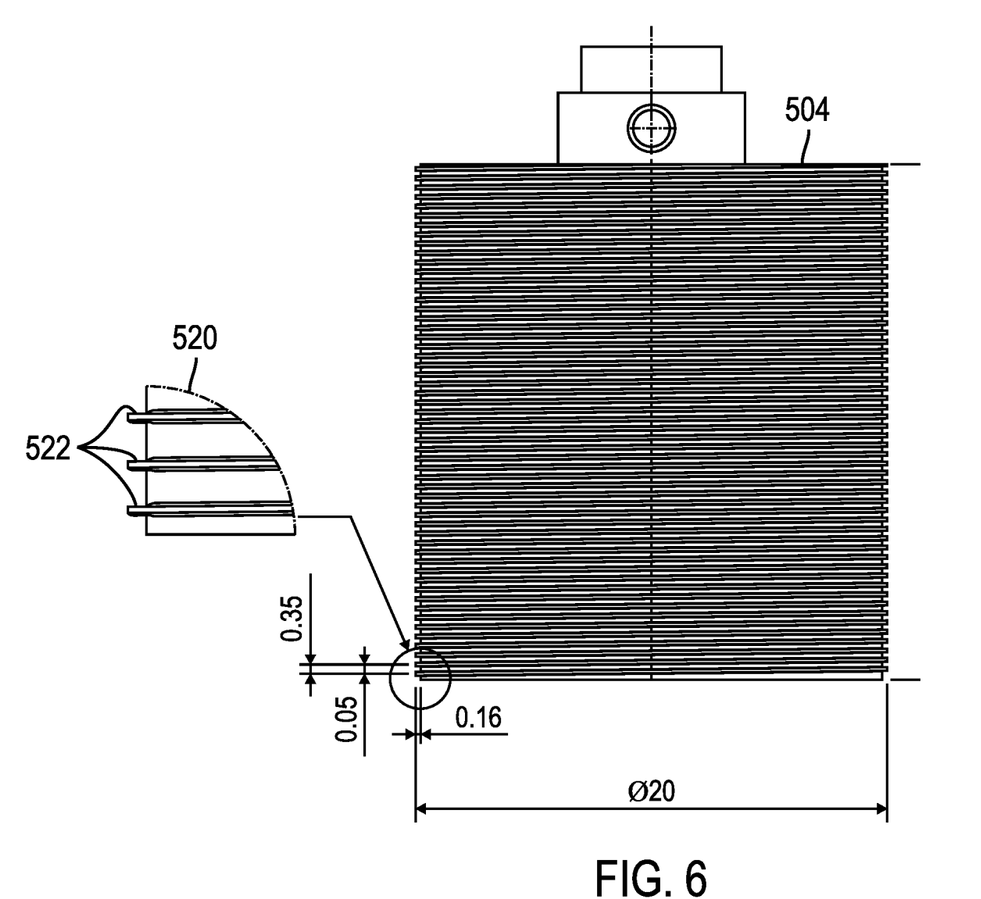
FIG. 6 illustrates an embodiment of a roller barrel of the tape guide roller of FIG. 5.

FIG. 6 illustrates an embodiment of the grooves in the roller barrel 504 as having spaced apart ridges, which may be parallel or in a spiral formation. Magnified view 520 shows the ridges 522 forming the grooves in the barrel 504. In one embodiment, the grooves 522 are spaced at a distance of 0.05 mm apart and the roller barrel 500 has a diameter of 20 mm, where distances in the diagram are in millimeters (mm).

Figure 7:
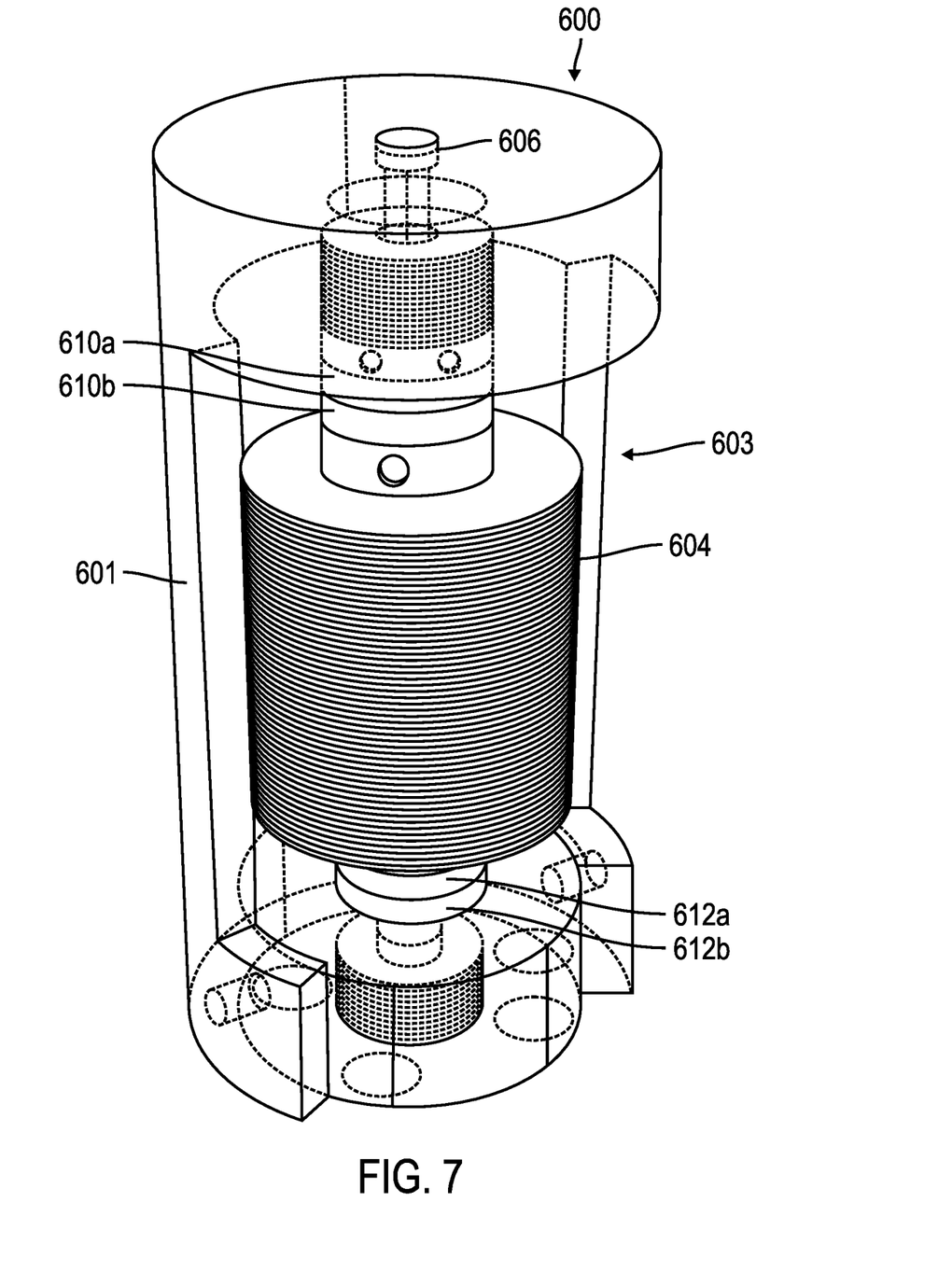
FIG. 7 illustrates a perspective view of the tape guide roller of FIG. 5.

FIG. 7 provides a perspective view of the guide roller 500 of FIG. 5 with the housing 601 shown transparent with an opening 603 exposing the roller barrel 604, upper bushing 606, and upper 610a, 610b and lower 612a, 612b ring passive magnet bearings. The housing 601 opening 603 exposes an extended surface of the roller barrel 604 to engage the tape medium passes.

Figure 8:
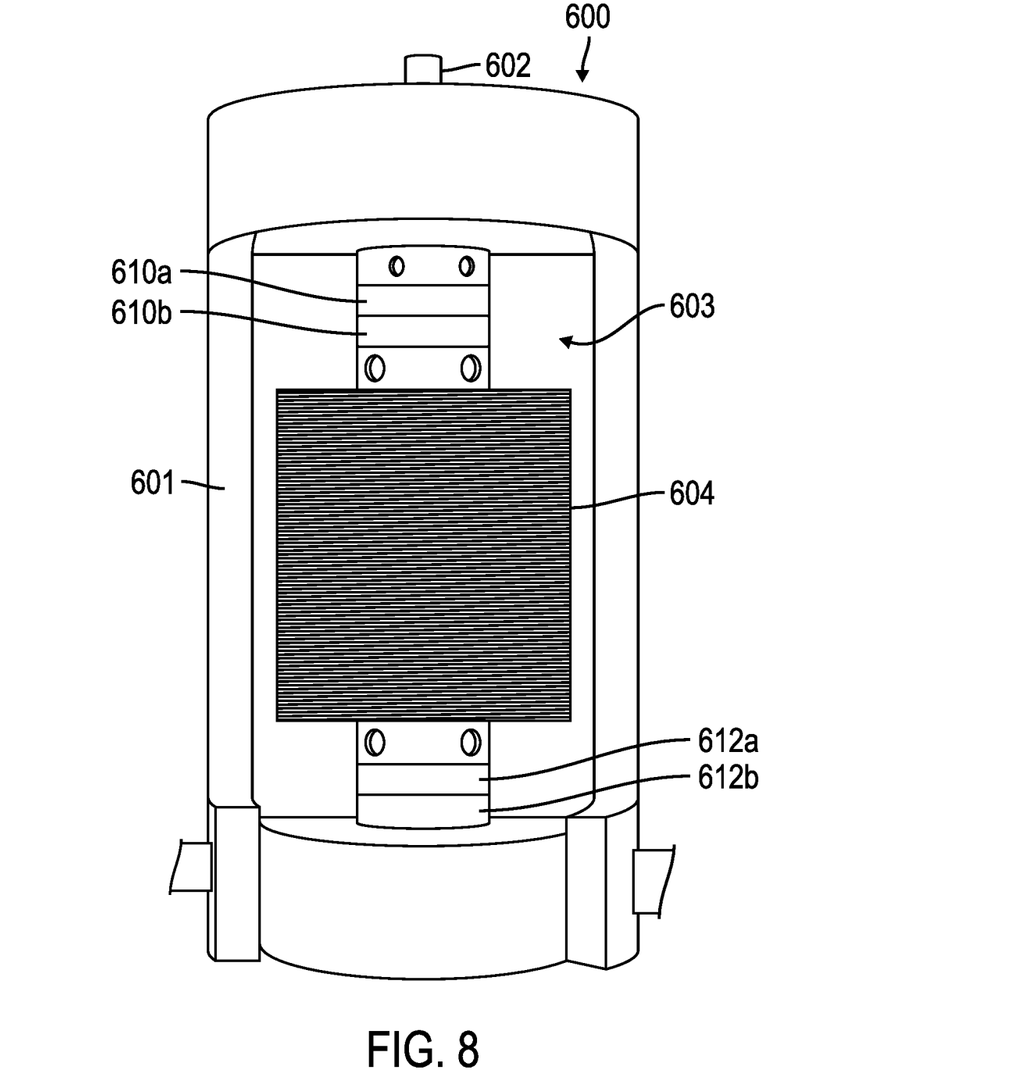
FIG. 8 illustrates a frontal view of an embodiment of the tape guide roller of FIG. 5.

FIG. 8 illustrates a front view of the guide roller 600 of FIGS. 5, 6, and 7, showing the housing 601, the roller barrel 604, two upper magnets 610a, 610b, two lower magnets 612a, 612b, tip of the axle 602, and the opening 603 in the housing 601 exposing the surface of the roller barrel 604 to engage the tape medium.

Figures 9, 10:
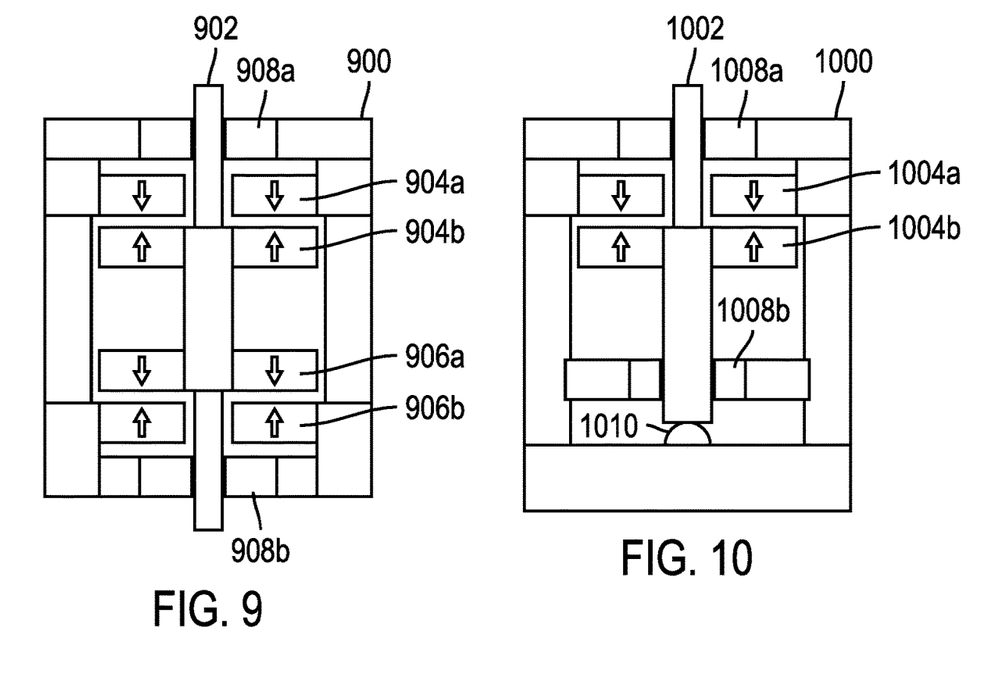
FIGS. 9, 10, and 11 illustrate embodiments of the location of magnets, bushings, and thrust bearings in the tape guide roller.

FIG. 9 illustrates an embodiment of the positioning of the magnets within the tape guide roller 900 with respect to the axle 902. There are two upper magnets 904a, 904b of opposite polarization and two lower magnets 906a, 906b of opposite polarization and bushings 908a, 908b, such as deployed in FIGS. 3, 4, 5, 7, and 8.

FIG. 10 shows an alternative embodiment for placement of the magnets within the tape guide roller 1000 with respect to axle 1002. There is one set of magnets 1004a, 1004b of opposite polarity at the upper end of the tape guide roller 1000. Bushings 1008a and 1008b stabilize the axle 1002 radially. A thrust bearing 1010 may be positioned below the lower end of the axle 1002 to further stabilize the axle 1002. The thrust bearing 1010, composed of the hemisphere/ball and surrounding flat surface, may comprise the same material as the bushings 1008a, 1008b, such as a synthetic sapphire/ruby or corundum, or may be composed of a steel ball or tip on a brass or steel flat, or may be composed of a steel shaft with a polished flat on a steel, (synthetic) sapphire, ruby or corundum ball or hemisphere to engage the bottom end of the axle 1002. The thrust bearing may be lubricated or unlubricated. In a further embodiment, there may be two pairs of axial magnets, e.g., passive magnet bearings, as shown in FIG. 9, with a thrust bearing at the bottom end of the axle 1002 as shown in FIG. 10. The thrust bearing 1010 provides axial stabilization of the axle 1002.

Figure 11:
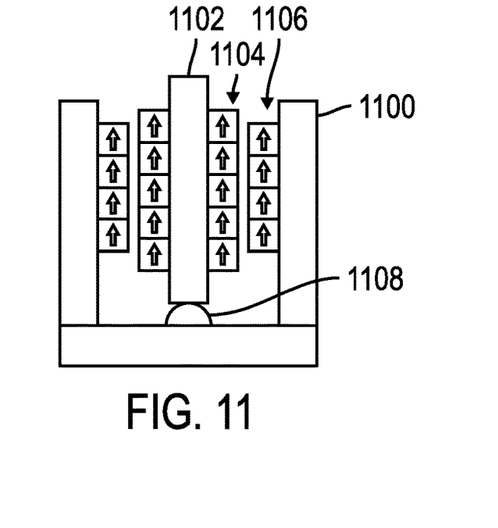

Further embodiments may vary the placement and number of magnets, and polarity of the arranged magnets, and may optionally include the thrust bearing at the upper end of the axle. For instance, FIG. 11 shows an alternate magnet and thrust bearing configuration for guide roller 1100 having an axle 1102 and axial radial passive bearing magnets comprising stacks of concentric ring magnetics, including five inner PBM magnet rings 1104 and four outer PBM magnet rings 1106, and a thrust bearing 1108. The magnets 1104 and 1106 have the same polarity.

Figure 12:
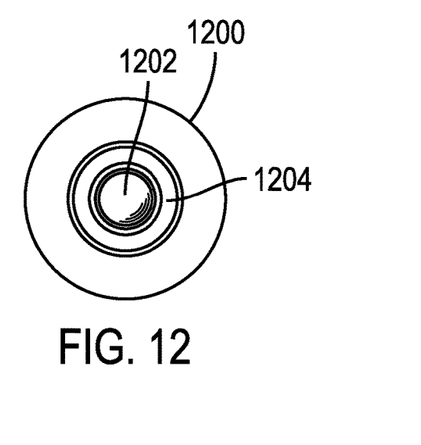
FIG. 12 illustrates an embodiment of a thrust bearing.

FIG. 12 illustrates an embodiment of the thrust bearing 1200 including an inner ball 1202 comprised of a material such as synthetic sapphire, synthetic ruby or corundum. The axle end may contact the ball portion 1202 of the thrust bearing 1200 and fit through the opening of bushing 1204 of the thrust bearing 1200.

The above embodiments employing the magnets, bushings, and thrust bearing have been found to substantially reduce the position error signal (PES) read/write detects during tape operation by providing axial and radial stability.

In above embodiments, magnets and bushings are used. In alternative embodiments, magnets or bushings may be used alone to provide stabilization to reduce the position error signal The present invention may be a guide roller, tape drive, and method for implementing a guide roller. system, a method, and/or a computer program product implemented in the controller 110.

In the described embodiment, variables i, n, etc., when used with different elements may denote a same or different instance of that element.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A tape guide roller to guide a tape medium with respect to a read or write head to read or write with respect to the tape medium, comprising:
    a roller barrel extending around a vertical axis, wherein the tape medium passes across the roller barrel to guide the tape medium on a tape path;
    an axle extending through the roller barrel; and
    at least one pair of opposing rings of passive magnetic bearings extending around the vertical axis and having opposite polarity, within an open space of the roller barrel, to provide an axial force to stabilize the tape guide roller axially, wherein each pair of rings of passive magnetic bearings are separated by a distance on the vertical axis.

2. The tape guide roller of claim 1, further comprising:
    a first inner support structure coupled to the axle and the roller barrel;
    a first inner magnet coupled to the first inner support structure;
    a first outer support structure;
    a first outer magnet coupled to the first outer support structure;
    a second inner support structure coupled to the axle and the roller barrel;
    a second inner magnet coupled to the second inner support structure;
    a second outer support structure; and
    a second outer magnet coupled to the second outer support structure, wherein the first and the second inner support structures are between the first and the second outer support structures along the vertical axis.

3. A tape guide roller to guide a tape medium with respect to a read or write head to read or write with respect to the tape medium, comprising:
    a roller barrel extending around a vertical axis, wherein the roller barrel has an upper end and a lower end with respect to the vertical axis, wherein the tape medium passes across the roller barrel to guide the tape medium on a tape path;
    a first pair of magnets positioned along the vertical axis closer to the upper end than the lower end of the roller barrel; and
    a second pair of magnets positioned along the vertical axis closer to the lower end than the upper end of the roller barrel, wherein the first pair and the second pair of magnets are within an open space of the roller barrel and provide an axial force to stabilize the tape guide roller axially.

4. The tape guide roller of claim 3, further comprising:
    an axle extending along the vertical axis through the roller barrel and the first pair and the second pair of magnets, wherein the axle has an upper end and a lower end with respect to the vertical axis;
    a first bushing positioned above the first pair of magnets on the vertical axis, wherein the axle extends through the first bushing; and
    a second bushing positioned below the second pair of magnets on the vertical axis, wherein the axle extends through the second bushing, wherein the first and the second bushings stabilize the tape guide roller radially.

5. The tape guide roller of claim 4, wherein the first and the second bushings are comprised of a material that is a member of a set of materials comprising: a synthetic sapphire, a synthetic ruby, and corundum.

6. A tape drive to perform read or write operations with respect to a tape medium, comprising:
    a read or write head to read or write with respect to the tape medium;
    a tape guide roller to guide the tape medium with respect to the read or the write head, comprising:
        a roller barrel extending around a vertical axis, wherein the tape medium passes across the roller barrel to guide the tape medium on a tape path;
        an axle extending through the roller barrel; and
        at least one pair of opposing rings of passive magnetic bearings extending around the vertical axis and having opposite polarity, within an open space of the roller barrel, to provide an axial force to stabilize the tape guide roller axially, wherein each pair of rings of passive magnetic bearings are separated by a distance on the vertical axis.

7. The tape drive of claim 6, wherein the tape guide roller further comprises:
    a first inner support structure coupled to the axle and the roller barrel;
    a first inner magnet coupled to the first inner support structure;
    a first outer support structure;
    a first outer magnet coupled to the first outer support structure;
    a second inner support structure coupled to the axle and the roller barrel;
    a second inner magnet coupled to the second inner support structure;
    a second outer support structure; and
    a second outer magnet coupled to the second outer support structure, wherein the first and the second inner support structures are between the first and the second outer support structures along the vertical axis.

8. A tape drive to perform read or write operations with respect to a tape medium, comprising:
    a read or write head to read or write with respect to the tape medium;
    a tape guide roller to guide the tape medium with respect to the read or the write head, comprising:
        a roller barrel extending around a vertical axis, wherein the roller barrel has an upper end and a lower end with respect to the vertical axis, wherein the tape medium passes across the roller barrel to guide the tape medium on a tape path;
        a first pair of magnets positioned along the vertical axis closer to the upper end than the lower end of the roller barrel; and
        a second pair of magnets positioned along the vertical axis closer to the lower end than the upper end of the roller barrel, wherein the first pair and the second pair of magnets are within an open space of the roller barrel and provide an axial force to stabilize the tape guide roller axially.

9. The tape drive of claim 8, wherein the tape guide roller further comprises:
    an axle extending along the vertical axis through the roller barrel and the first pair and the second pair of magnets, wherein the axle has an upper end and a lower end with respect to the vertical axis;
    a first bushing positioned above the first pair of magnets on the vertical axis, wherein the axle extends through the first bushing; and
    a second bushing positioned below the second pair of magnets on the vertical axis, wherein the axle extends through the second bushing, wherein the first and the second bushings stabilize the tape guide roller radially.

10. The tape drive of claim 9, wherein the first and the second bushings are comprised of a material that is a member of a set of materials comprising: a synthetic sapphire, a synthetic ruby, and corundum.

11. A tape guide roller to guide a tape medium with respect to a read or write head to read or write with respect to the tape medium, comprising:
a housing, including:
   a roller barrel extending around a vertical axis, wherein the tape medium passes across the roller barrel to guide the tape medium on a tape path;
   an axle extending through the roller barrel;
   at least one pair of opposing rings of passive magnetic bearings extending around the vertical axis and having opposite polarity, within an open space of the roller barrel, to provide an axial force to stabilize the tape guide roller axially, wherein each pair of rings of passive magnetic bearings are separated by a distance on the vertical axis; and
   an opening in the housing exposing a surface of the roller barrel to engage the tape medium.

12. A tape guide roller to guide a tape medium with respect to a read or write head to read or write with respect to the tape medium, comprising:
a housing, including:
   a roller barrel extending around a vertical axis, wherein the roller barrel has an upper end and a lower end with respect to the vertical axis, wherein the tape medium passes across the roller barrel to guide the tape medium on a tape path;
   an opening in the housing exposing a surface of the roller barrel to engage the tape medium;
   a first pair of magnets positioned along the vertical axis closer to the upper end than the lower end of the roller barrel; and
   a second pair of magnets positioned along the vertical axis closer to the lower end than the upper end of the roller barrel, wherein the first pair and the second pair of magnets are within an open space of the roller barrel and provide an axial force to stabilize the tape guide roller axially.

13. The tape guide roller of claim 12, further comprising:
an axle extending along the vertical axis through the roller barrel and the first pair and the second pair of magnets, wherein the axle has an upper end and a lower end with respect to the vertical axis;
a first bushing positioned above the first pair of magnets on the vertical axis, wherein the axle extends through the first bushing; and
a second bushing positioned below the second pair of magnets on the vertical axis, wherein the axle extends through the second bushing, wherein the first and the second bushings stabilize the tape guide roller radially.

\* \* \* \* \*